Nov. 27, 1956 W. F. COLLISON ET AL 2,772,048

READOUT UTILIZING RADIX CONVERSION FOR AN ELECTRONIC CALCULATOR

Filed March 15, 1954 5 Sheets-Sheet 1

INVENTORS,
William F. Collison &
Fred N. Schwend

BY

ATTORNEY.

INVENTORS,
William F. Collison &
Fred N. Schwend
BY
Fred N. Schwend
ATTORNEY

Nov. 27, 1956 W. F. COLLISON ET AL 2,772,048

READOUT UTILIZING RADIX CONVERSION FOR AN ELECTRONIC CALCULATOR

Filed March 15, 1954 5 Sheets-Sheet 3

INVENTORS,
William F. Collison &
Fred N. Schwend

BY Fred N. Schwend

ATTORNEY.

INVENTORS,
William F. Collison &
Fred N. Schwend
BY
Fred N. Schwend
ATTORNEY

Nov. 27, 1956 W. F. COLLISON ET AL 2,772,048

READOUT UTILIZING RADIX CONVERSION FOR AN ELECTRONIC CALCULATOR

Filed March 15, 1954 5 Sheets-Sheet 5

INVENTORS,
William F. Collison &
Fred N. Schwend

BY Fred N. Schwend

ATTORNEY

United States Patent Office 2,772,048

Patented Nov. 27, 1956

2,772,048

READOUT UTILIZING RADIX CONVERSION FOR AN ELECTRONIC CALCULATOR

William F. Collison, Pasadena, and Fred N. Schwend, El Monte, Calif., assignors to Clary Corporation, a corporation of California Application March 15, 1954, Serial No. 416,141

12 Claims. (Cl. 235—58)

This invention relates to electronic computing equipment and has particular reference to read-out systems adapted to record or otherwise register in intelligible form amounts computed by such equipment. Specifically, the present invention is applicable to effect control of a reciprocal actuator or rack type printing or calculating machine by a coded input circuit.

Although electronic counting and computing devices are available which are capable of registering amounts in the decimal numeral system, the majority of such equipment embodies counters or the like, capable of counting according to non-decimal systems, such as the binary, biquinary, or other coded numeral systems. Such non-decimal systems generally have certain advantages which make their use desirable. Primarily, the latter systems require fewer components or counting stages resulting in simpler, less expensive, and more reliable apparatus.

However, since numerical data is generally represented in the decimal system, certain difficulties arise in understanding and dealing with a non-decimal system and it is therefore desirable to translate non-decimal data obtained from electronic computing equipment into decimal data so that the values may be more readily comprehended.

Read-out equipment has heretofore been proposed and developed for translating non-decimal data into decimal data as an incident to read-out operations. However, such equipment has in general comprised electric circuitry including matrices of electrical switching components such as diodes, relays or the like, having either ten output lines leading to respective electro-magnetic devices for controlling differential actuators, or ten output lines for successively actuating ten amount entry devices such as ten amount entry keys.

A principal object of the present invention is to provide a read-out system for a pulse actuated counter, register or accumulator embodying a mechanical translating mechanism for translating data from one numeral system to another.

Another object is to reduce to a minimum the time required to effect a read-out operation of a pulse actuated counter or accumulator.

A further object is to provide a read-out system including a device for translating data from one numeral system to another in which no time delay is necessary for effecting such translation.

A further object is to provide a read-out system for transferring amounts from a non-decimal counter or accumulator to a decimal read-out machine with a minimum of circuitry.

A further object is to provide a relatively simple and inexpensive combined read-out and data translating system.

The manner in which the above and other objects of the invention are accomplished will be readily understood on reference to the following specification when read in conjunction with the accompanying drawing, wherein.

*General arrangement*

Figure 1:
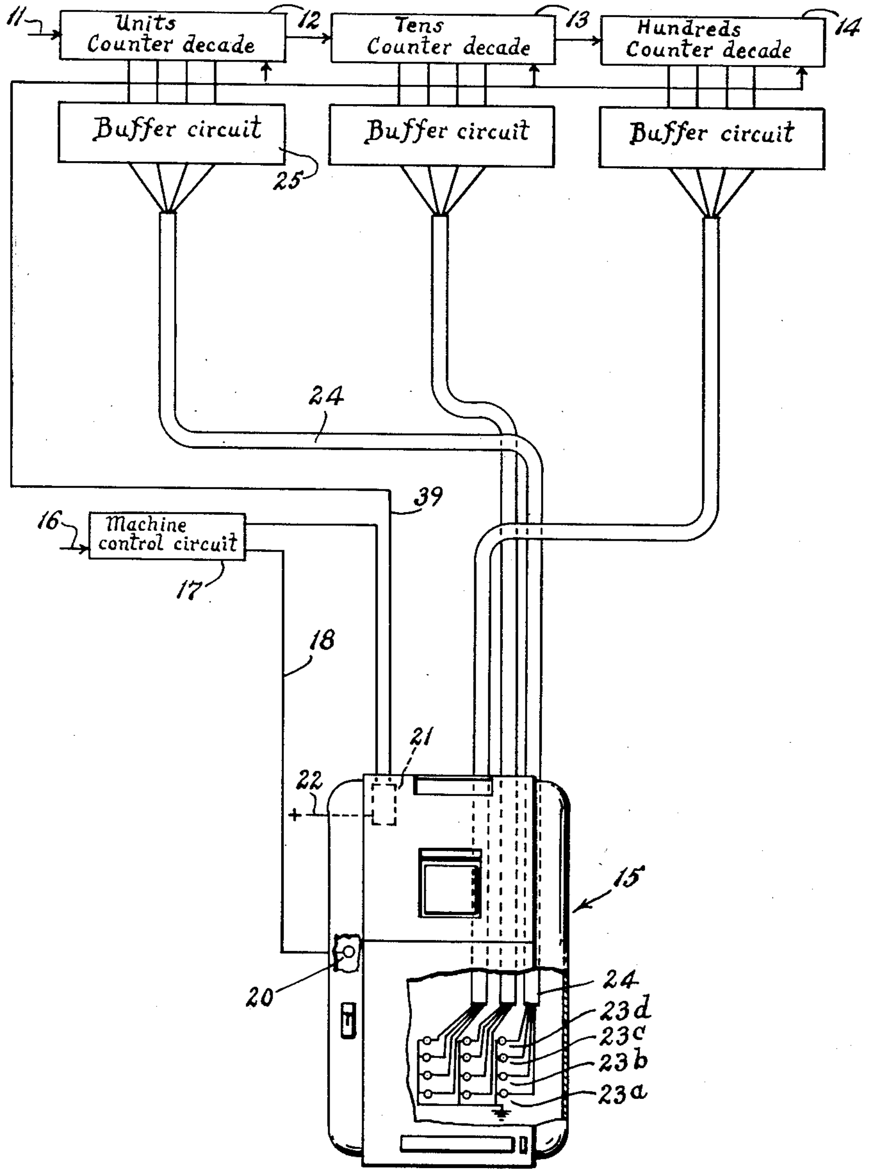
Fig. 1 is general schematic view of a read-out system embodying the present invention.

In order to first obtain a general understanding of the read-out system embodying the present invention, reference is had to Fig. 1 showing the various operating components of the system.

Pulses to be counted are applied to an input line 11 and are fed to an electronic counter comprising three counter decades 12, 13 and 14 connected in cascade. Each of the latter is of the binary type having four stages of binary of scale-of-two counting circuits capable of counting from zero to nine. Suitable circuit arrangements transfer a carryover unit of tens transfer pulse from one decade to the next, upon accumulation of ten pulses.

A mechanical computing or adding machine, generally indicated at 15, is provided having a mechanical accumulator and a printing mechanism, to be hereinafter described.

When it is desired to determine and record in decimal form an amount registered in the counter, a signal pulse is applied to a signal line 16 to energize a machine control circuit 17. The latter, through a line 18, becomes effective to energize a solenoid, generally indicated at 20, to initiate a cycle of operation of the machine 15. Simultaneously, a circuit is completed through a normally closed switch 21, from a source of power 22, and through a series of groups of solenoids 23*a*, 23*b*, 23*c*, and 23*d* provided in the machine. Four such solenoids are located in each denominational order of the machine and the solenoids in each order are connected through a group of four lines 24 to respective stages of a buffer circuit, like buffer circuit 25, associated with four stages of a respective counter decade, like decade 12.

Thus, in each denominational order of the machine, the four solenoids 23*a*, etc., located therein are directly associated with the respective stages of a corresponding decade of the counter, and during a read-out operation one or more or none of such solenoids will be energized depending on the digital condition of the corresponding counter decade.

The four solenoids 23*a*, etc., of each order will control a differential actuator in the machine to simultaneously digitize the machine accumulator and set the printer thereof to print in each order, a decimal amount corresponding to the binary amount registered in the corresponding decade in the counter.

*Counter decade unit*

Although any of various forms of counter decades operating on the binary or other non-decimal principle may be used, the specific counter circuit illustrated is similar to that disclosed in the patent to J. T. Potter, No. 2,538,122. Therefore, only a general description of this counter is deemed necessary.

Figure 2:
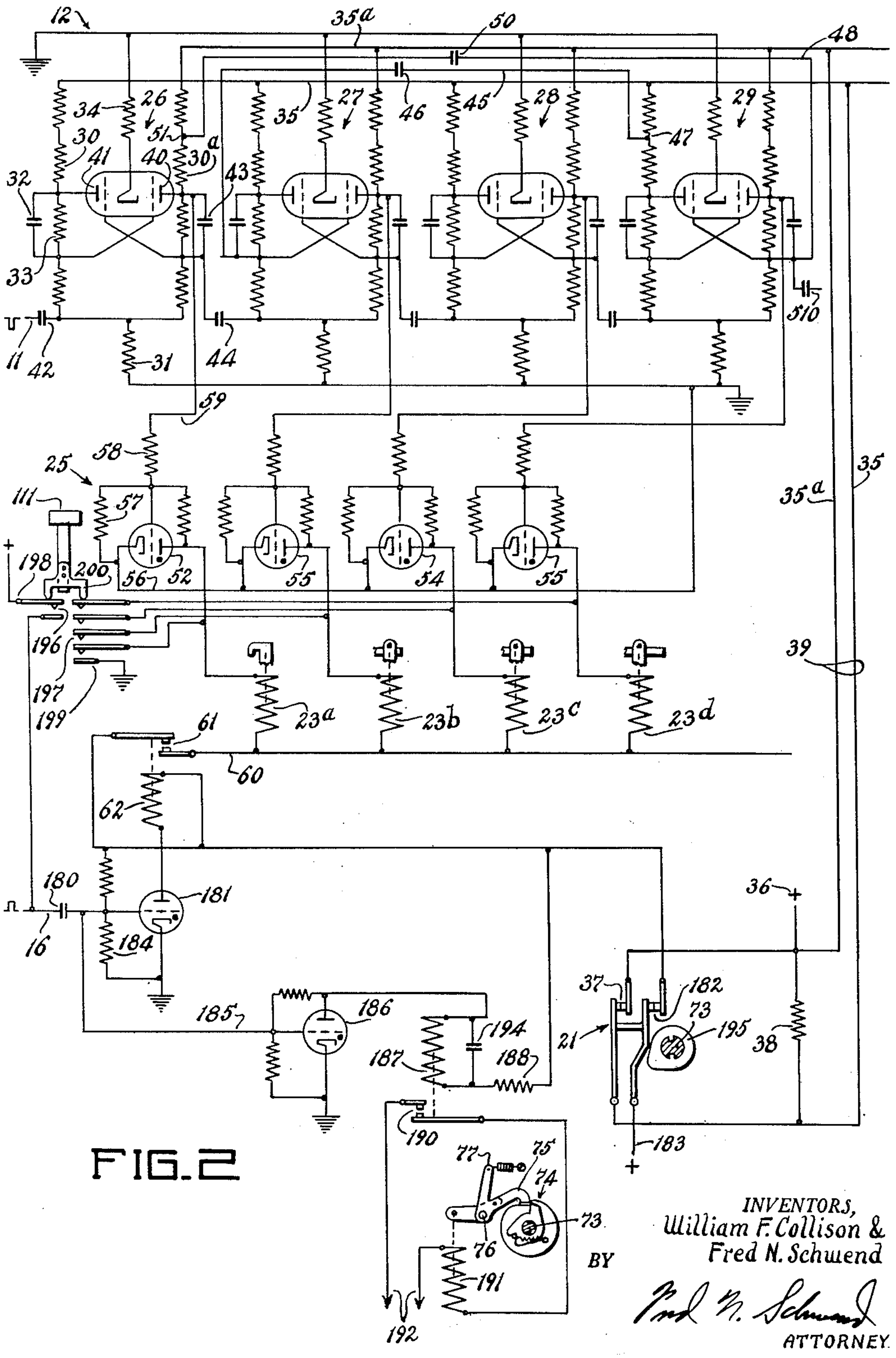
Fig. 2 is a circuit diagram illustrating an electronic counter decade and buffer circuits associated therewith for controlling a combined read-out and data translating machine.

The units decade 12 is shown in circuit detail in Fig. 2, and it is to be understood that the tens and hundreds decades 13 and 14, respectively, are similar in all respects.

The counter decade 12 comprises four bi-stable multi-vibrator stages 26, 27, 28, and 29. These stages are of the well-known Eccles-Jordan type. Each multi-vibrator stage includes a dual triode vacuum tube with left and right hand voltage divider circuits 30 and 30*a* associated with respective triodes of the tubes. Each pair of voltage dividers is connected to ground through a common resistor 31.

The anode of each triode is cross connected to the grid of the opposite triode through a parallel connection comprising a capacitor and resistor like capacitor 32 and resistor 33, the latter forming part of the respective voltage divider. The cathode of each tube is connected through a bias resistor, like resistor 34, to ground.

Anode potential is normally applied from two anode supply lines 35 and 35*a*, to the upper ends of respective ones of the left and right voltage dividers, i. e., 30 and 30*a*. The anode supply line 35*a* is connected directly to a source of positive potential 36. The other anode supply line 35 is connected to the supply source 36 through normally closed contacts 37 of the aforementioned switch 21.

A resistor 38 is connected across the anode supply lines 35 and 35*a*, through a circuit 39, for resetting purposes as will appear hereinafter.

Normally, in zero or standby condition the right hand triode of each counter tube is in a conducting state and the left hand unit is rendered non-conductive in accordance to the principles of such multi-vibrator circuits. Thus, in zero condition of the decade, the right hand anodes, like anode 40, are at relatively low potential whereas the left hand anodes, like anode 41, are at relatively high potential.

Pulses to be counted are of a negative nature and are applied through the input line 11 and a coupling condenser 42 to the juncture of the lower ends of the voltage dividers 30 and 30*a*, in the first (left hand) counter stage 26. The leading edge of the count pulse lowers the potential of the right hand grid of the first counter stage to a point below the tube cut-off potential, thus raising the potential of the anode 40. This rise in voltage is applied through condenser 43 to the grid of the left hand triode, raising the latter above the cut-off potential and causing the right side of the tube to conduct.

The second pulse transmitted over the line 11 will again lower the potential on both the grids of the first tube to reverse the condition of the latter back to its original state, and in so doing will again lower the potential of the anode 40, thereby transmitting a negative pulse through a coupling capacitor 44 to the juncture of the lower ends of the voltage dividers in the second counter stage 27.

The various counting stages are connected in a similar manner so that upon each second reversal of a previous stage a negative pulse will be transmitted to the next higher order stage to reverse the condition thereof.

The natural sequence of circuit connections effected in each counter decade will be found to occur in accordance with a binary progression of 1, 2, 4, and 8. Thus, when any of the left hand triodes of the tubes in the stages 26, 27, 28, and 29 are in conducting condition, they represent the values 1, 2, 4, and 8, respectively.

Thus, the sequence of events would normally continue until the decade is returned to zero condition at the count of sixteen. However, in order to return the decade to its zero condition at the count of 10 certain feedback circuits are incorporated. These circuits comprise a line 45 and coupling condenser 46 connected from a point 47 on the left hand voltage divider for stage 29 to the connection for the right hand grid of the tube in stage 27. A second line 48 is connected from the grid connection for the left hand triode in stage 29, through a coupling condenser 50, to a point 51 on the right hand voltage divider 30*a* of stage 26.

Although a drop in potential is applied along line 48 during every second reversal of the first stage 26, this drop is insufficient to block the normally conducting right hand anode of stage 29. However, upon reception of the eighth pulse, the condition of stage 29 is reversed, raising the potential of the right hand anode and consequently causing conduction of the left hand triode of this stage. The stage 29 remains in this condition throughout the ninth count, and upon reception of the tenth pulse, the anode 40 of the first stage 26 again drops in potential to send a pulse through the line 48 to drive the left hand triode of stage 29 below cutoff potential, reversing the condition of stage 29 to its normal condition and transmitting a negative pulse through a coupling condenser 510 to the first stage of the next higher order counter decade, i. e., 13.

Consequently, all stages in the decade 12 are now returned to their zero conditions. In order to prevent reversal of the second stage 27 due to the transfer of a negative pulse from stage 26 as incident to reversal of the latter stage at the count of 10, the line 45, at this time, transmits a positive pulse from the point 47 to the right hand grid of the triode in stage 27. This action prevents reversal of stage 27.

The various stages of each counter decade are connected to respective solenoids, like solenoids 23*a*, 23*b*, 23*c*, 23*d*, in the read-out machine through the aforementioned buffer circuits, like circuit 25. The latter comprises a group of buffer stages including tubes 52, 53, 54, and 55 operable independently of each other. The latter tubes are preferably of the glow discharge, cold cathode gas type, such as those commercially known and available as R. C. A. No. 5823.

The cathodes of the various buffer tubes are connected to a ground line 56, and a bias resistor, like resistor 57, is connected between the cathode and the ignitor of each tube to normally bias the latter to the point just below its firing potential.

The ignitors of the various buffer tubes 52 to 55 are connected through isolating resistors, like resistor 58 and line 59, to a right hand anode, like anode 40, of the tubes in respective ones of the counter decade stages 26 to 29. The anodes of the buffer tubes 52 to 55 are directly connected through solenoids 23*a* to 23*d*, respectively, to a common line 60 which, in turn, is connected to normally open contacts 61 of a relay 62.

*Read-out machine*

The construction of the read-out machine 15 is basically similar to that found in the well-known Clary adding machine which is disclosed and claimed in Patent No. 2,583,810, issued to R. E. Boyden on January 29, 1952. The accumulating mechanism of this machine is disclosed and claimed in Patent No. 2,472,696, issued to E. P. Drake on June 7, 1949.

Since the basic structure of the machine is disclosed in the above patents, only those portions thereof which relate to the present invention or which have been modified to embody part of the present invention, will be described in detail. Reference may be made to the above patents for a complete disclosure of the machine. However, it is to be understood that the invention is not limited to the particular machine disclosed.

The machine 15 includes a series of denominationally arranged differential actuating racks 65. The latter are supported for fore and aft movement by transversely extending shafts 66 and 67 embraced by guide slots 68 and 69, respectively, in each of the racks. The shaft 67 is stationary but the shaft 66 is moved fore and aft of the machine once during each machine cycle between its full line position illustrated in Fig. 3 and its dotted line position 66*a*.

The drive shaft 66 is yieldably connected to each rack 65 by pairs of opposed drive pawls 69 and 70 pivotally mounted on the shaft and carrying rollers 71 which normally engage in lateral depressions formed at the closed end of each rack slot 68. A spring 72 urges the pawls 69 and 70 outwardly to hold the rollers 71 in the lateral slot depressions, coupling the racks to the shaft 66 until the racks are arrested. At this time, the rollers move out of the depressions and along the edges of the slots 68.

The machine is driven by a rotatable drive shaft 73 (Figs. 2, 7, 8, and 9) through a cyclically operable clutch, generally indicated at 74, which is driven by a suitable motor (not shown). The clutch is controlled by clutch dog 75 pivotally supported at 76 and urged by a spring 77 into its illustrated position wherein it normally maintains the clutch in disengaged condition.

For the purpose of advancing the drive shaft 66 from its full-line illustrated position to its dotted line position 66*a* during the first part of a machine cycle and returning the same during the latter half of the cycle, a pair of complementary cams 78 and 79 (Fig. 8) are keyed on the shaft 73 and are engaged by rollers 80 and 81, respectively, carried on a cam follower 82. The later is fulcrumed on a frame pin 83 and is connected by a link 84 to a bifurcated arm 85. The arm 85 is attached to one end of a rock shaft 86 and embraces a roller 87 carried on one end of the shaft 66. The roller rides in a slot 88 formed in an adjacent machine size frame plate 89. An arm (not shown) similar to arm 85 is secured to the opposite end of the shaft 86 for the purpose of embracing a roller on the opposite end of the shaft 66 so as to cause parallel movement of this shaft during a machine cycle.

The machine accumulator, generally indicated at 90 (Fig. 3), comprises a series of denominationally arranged accumulator gears 91 independently and rotatably mounted on an accumulator shaft 92. As described in detail in the aforementioned Boyden and Drake patents the accumulator is raised or lowered to mesh the accumulator gears 91 with upper or lower rack gear sections 93 and 94, respectively, depending upon the type of operation being performed.

During a normal read-out operation, the accumulator is raised to mesh the accumulator gears 91 with the rack sections 93 during forward advance of the racks and lowered to their normal illustrated positions during the return of the racks. During totalling operations, however, the accumulator is lowered to mesh the gears 91 with the lower rack gear sections 94 during the forward advance of the racks and returned to their neutral position during return of the racks.

Figure 9:
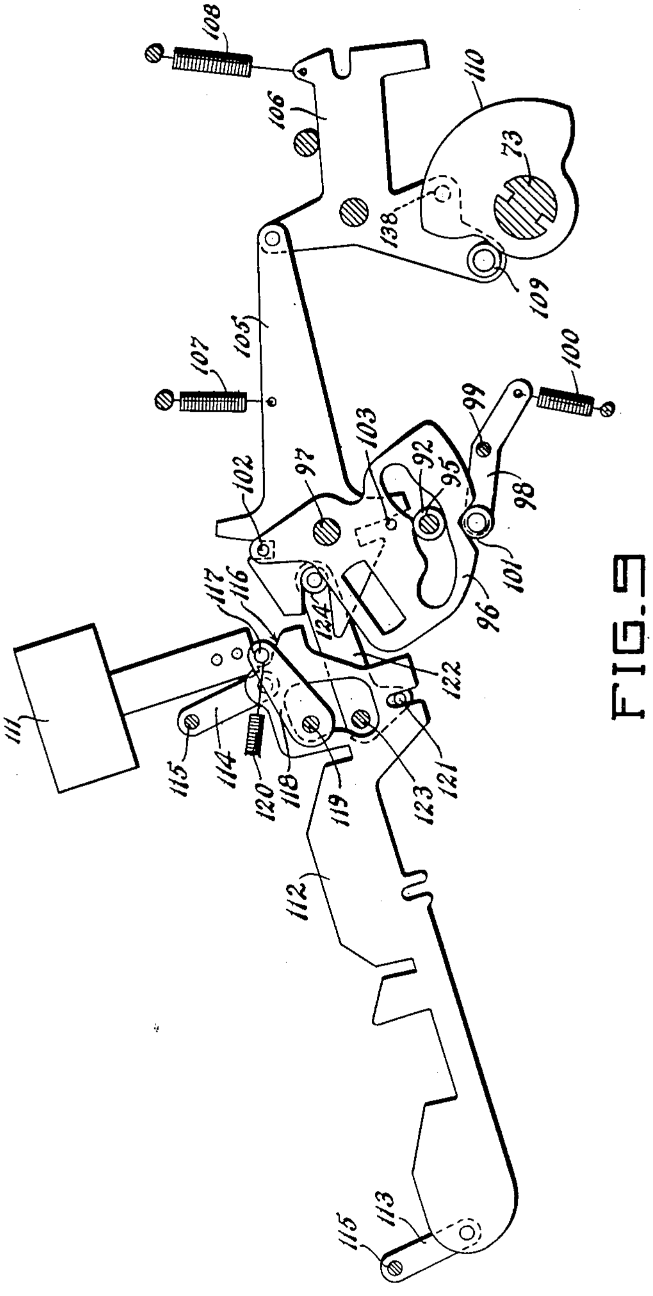
Fig. 9 is a sectional view illustrating the accumulator positioning controls.

Referring to Fig. 9, the accumulator shaft 92 is provided with rollers on the opposite ends thereof, one of which is shown at 95, embraced by a cam slot formed in a box cam 96. The latter is pivoted on a frame pin 97. This cam is normally held in its illustrated neutral position by a centralizer 98 pivoted at 99 and urged clockwise by a spring 100 to normally engage a centralizing notch 101 formed on the under edge of the box cam, thus, maintaining the accumulator in its illustrated neutral position.

The cam 96 carries a pair of pins 102 and 103 located on the opposite sides of the pivot 97 and adapted to be selectively engaged by a double hook member 105. The hook member is pivotally connected to a three armed cam follower 106. The hook member is normally held in its upper illustrated position by a tension spring 107 extending between a frame pin and the hook member so as to embrace the upper pin 102.

The cam follower 106 is normally held in its counter-clockwise rocked position, as illustrated, by a tension spring 108 extending between the cam follower and a frame stud to maintain a roller 109 thereon, against the periphery of a cam 110 keyed on the shaft 73. The cam has a high portion extending substantially half way about the periphery thereof, whereby to rock the cam follower and consequently the cam 96 to clockwise rocked positions where they are held during the first half of a machine cycle.

The member 105 is normally held in its raised position wherein it will be effective to cause cam 96 to raise the accumulator into engagement with the upper rack sections 93 to effect additive entries into the accumulator.

*Totalling controls*

Figures 6, 7, 8:
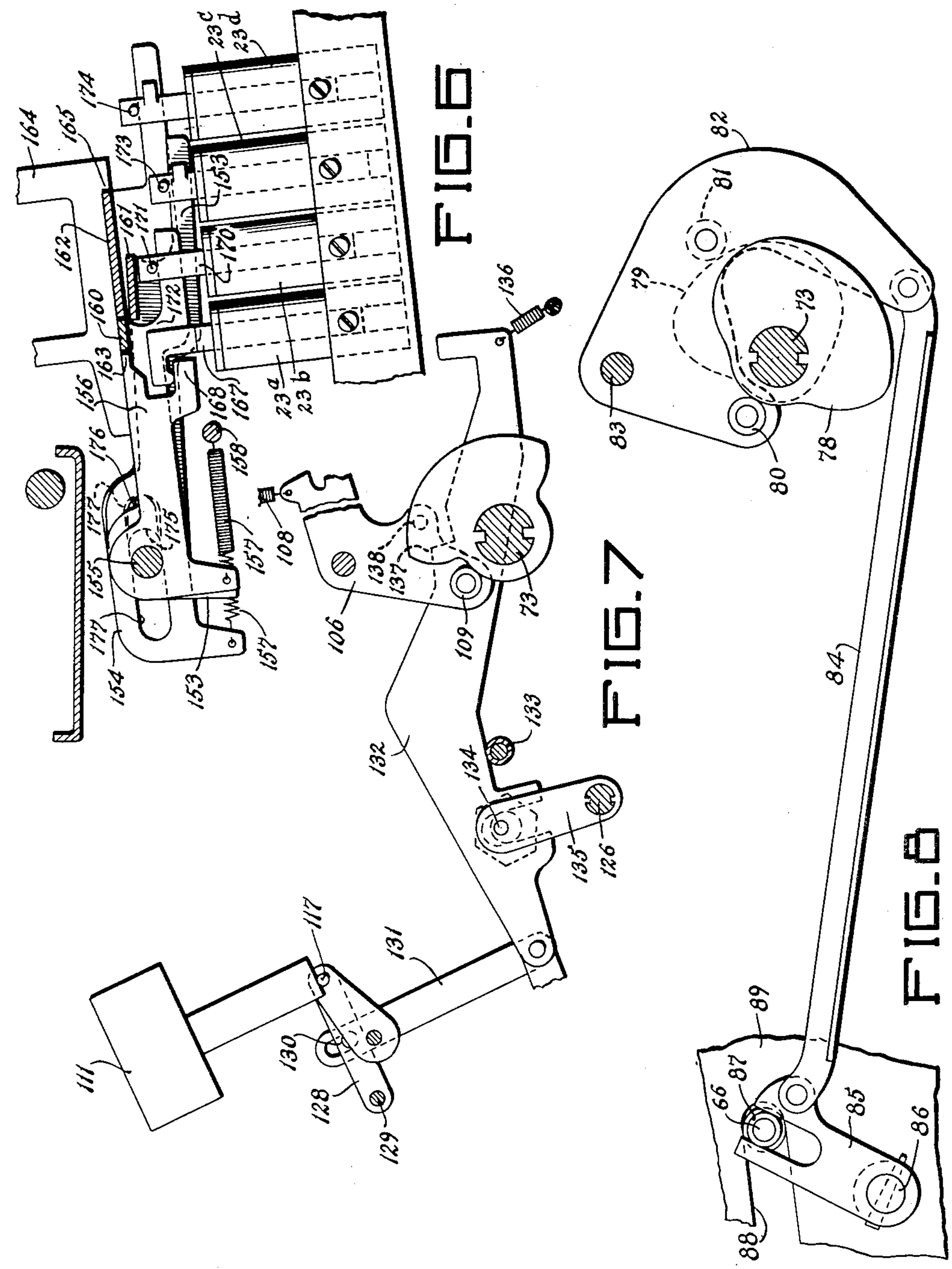
Fig. 6 is a sectional view similar to Fig. 3, but with parts broken away, showing the data translating device set in condition to effect registration of the digit "4."
Fig. 7 is a sectional side view illustrating part of the totalling controls.
Fig. 8 is a sectional view illustrating the rack drive mechanism.

Means are provided for lowering the hook member 105 in response to initiating a totalling operation of the machine effected by the depression of a total bar 111 (Figs. 2, 7, and 9). For this purpose a control bar 112 is provided, being supported for longitudinal movement by parallel links 113 and 114 pivotally supported by frame pin 117 carried on an arm 119 fulcrumed at 119 and urged upwardly by a spring 120 tensioned between the pin 117 and a suitable frame pin. The pin 117 also underlies the stem of the total bar 111.

The control bar 112 is connected by a pin and slot connection 121 to a bell crank 122 pivotally supported at 123 and coupled through a pin and slot connection 124 to the hook member 105. Thus, upon depression of the total bar 111, the control bar 112 will be advanced, rocking the bell crank 122 to lower the hook member 105 against the action of the spring 107. The hook member will then be caused to embrace the pin 103 of the box cam 96. During the ensuing totalling cycle initiated by depression of the total bar, the box cam 96 will be rocked counter-clockwise to lower the accumulator into mesh with the lower rack sections 94 of the racks.

During a totalling cycle, the accumulator gears are returned by the racks to zero registrations wherein they are blocked by a series of zero stop levers 125 keyed to a rockable shaft 126 and engageable by zero locating ears 127 carried on respective ones of the accumulator gears 91. For this purpose, the aforementioned pin 117 (Fig. 7) underlying the total bar is pivotally connected to one end of a link 128 which, for the purpose of the present invention, may be assumed to be pivotally supported at 129. The link 128 is connected at an intermediate point through a pin and slot connection 130 to a vertical link 131. The latter is connected to the forward end of a floating link 132 which is slideably fulcrumed on a frame pin 133. The link 132 is connected through a pin and slot connection 134 to an arm 135 secured to the aforementioned zero stop shaft 126.

Normally, when the total bar 111 is in raised position, a tension spring 136, extending between a suitable frame pin and the link 132, holds the latter in its illustrated position wherein a shoulder 137 thereof lies below the path of movement of a pin 138 carried by the aforementioned cam follower 106. However, upon depression of the total bar, the link 131 will be lowered to rock the link 132 about its fulcrum 133, permitting pin 138 to engage the shoulder 137 and thus advance the link 132 to the left, rocking the arm 135 and shaft 136 to position the zero levers 125 into blocking relation with accumulator gears.

*Printer*

The various values represented by the numerical positioning of the racks 65 during read-out and totalling operations are printed on a paper tape 140 which is fed from a suitable supply roll (not shown), and around a rotatable platen 141 which is incrementally advanced during each cycle of the machine to carry the tape to a printing station where the aforementioned values are printed thereon.

The printer comprises a series of printing dials, one of which is shown at 142, each associated with a respective one of the racks 65. Each dial has spaced around its periphery a series of type ranging in value "0" to "9," and these dials are so entrained with their respective racks that they will print digits corresponding to the numerical positions to which the racks are moved during their forward advancement.

Each printer dial is rotatably mounted on a separate lever 143 which is loosely keyed on a printer control shaft 144 and is spring urged clockwise by a spring 145 extending between the arm and a suitable frame pin. A gear 146 secured to each dial, is permanently meshed with an idler 147, also rotatably mounted on the associated lever 143. Except during printing operations, the levers 143 are held in their illustrated positions by the shaft 144, wherein each gear 147 meshes with an associated one in a series of idler gears 148 independently and rotatably mounted on a fixed support shaft 149. The latter gears are continuously entrained with off-set rack sections 150 carried by the various racks 65.

*Read-out controls*

In accordance with the present invention, a differential blocking device, generally indicated at 1552, is operatively associated with each of the racks 65 to differentially control the extent of advancement of the latter through any number increments from zero to nine.

Figures 3, 4, 5:
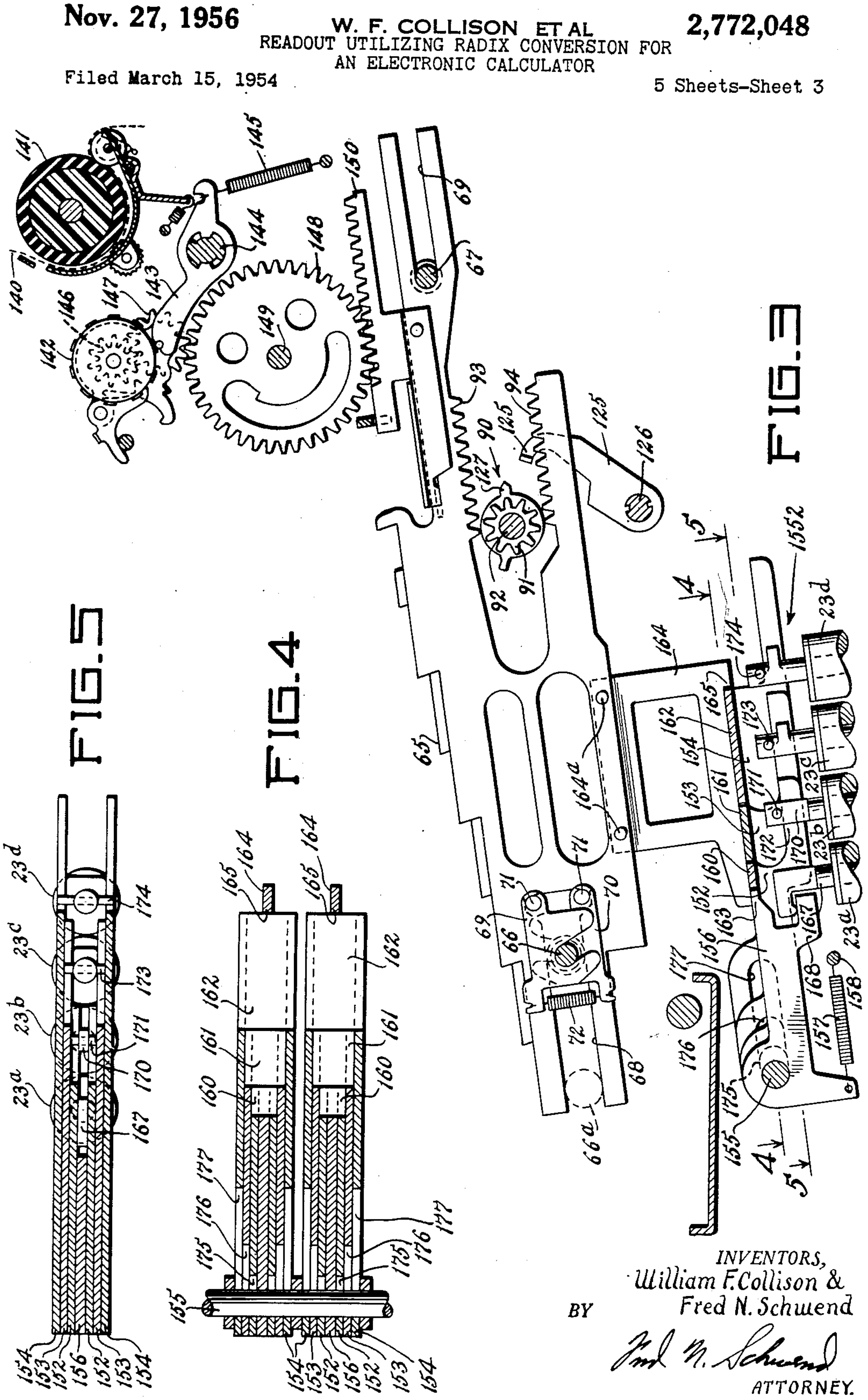
Fig. 3 is a longitudinal sectional view of the read-out machine, illustrating the mechanical accumulator, printing instrumentalities and mechanical data translation devices.
Fig. 4 is a sectional plan view showing two orders of the translating device and is taken generally along the line 4—4 of Fig. 3.
Fig. 5 is a sectional plan view similar to Fig. 4, but taken generally along the line 5—5 of Fig. 3.

Each of said control devices comprises a series of three nested blocking bails 152, 153, and 154 (Figs. 3, 4, and 5). The latter are rockably and slideably mounted independently of each other on a stationary cross rod 155 pivotally supported by the frame of the machine. Rockably mounted on the rod 155 within the sides of the innermost bail 152 is a blocking arm 156.

Individual springs, one of which is shown at 157, are extended between depending tails on each of the bails 152, 153, 154 and the arm 156 and a cross rod 158 to normally hold such bails and arm in their relative positions illustrated in Fig. 3. In this relationship of the parts, web or interengaging sections 160, 161, and 162 of the bails 152, 153, and 154, respectively, and a toe 163 of the arm 156 lie in serial abutment with each other and in engagement with a shoulder 165 on a piece 164 secured to the respective rack by rivets 164*a*. The web 162 of bail 154 lies directly in front of the stop shoulder 165 on the piece 164, thereby normally preventing an appreciable forward movement of the rack.

The various bails 152, 153, 154, and arm 156 are adapted to be rocked downwardly out of the path of the shoulder 165, either individually or together in different combinations under control of the various aforementioned solenoids, like solenoids 23*a*, 23*b*, 23*c*, 23*d*. For this purpose, the armature 167 of solenoid 23*a* is provided with a hook shaped upper end slideable between the sides of the bail 152 and engageable at its outer end with an extension 168 of the arm 156. Energization of solenoid 23*a* will accordingly lower the arm 156 to a position wherein its toe 163 will lie below the web 160 of bail 152.

The armature 170 of solenoid 23*b* is provided with a cross pin 171 at its upper end which overlies rearwardly extending legs 172 formed on the sides of bail 152. Likewise, the armatures for the solenoids 23*c* and 23*d* are provided with cross pins 173 and 174, respectively, which override extensions formed on respective ones of the bails 153 and 154. Thus, energization of any of the solenoids 23*a*, 23*b*, 23*c*, and 23*d* will be effective to lower the respective arm or bail to a position wherein its extension 163 or web 160, 161 or 162 will be located below the plane of the remaining webs.

It should be noted at this time that the web or engaging portion 160 of bail 152 is equal in length to two increments of movement of the rack 65 or, in other words, is equal to the pitch of two of the teeth of the accumulator gear 91. Likewise, the web 161 of bail 153 is four increments long and the web 162 of the bail 154 is eight increments in length. On the other hand, dual slots 175 formed in the bail 152 and embracing the rod 155, are of such a length that this bail is adapted to move one increment in the direction of movement of the rack when otherwise permitted to do so by downward rocking of arm 156. Likewise, slots 176 in bail 153 are of such a length that this bail may be moved three increments in a lengthwise direction, and slots 177 in bail 154 are of such a length that this bail may be moved seven increments in a lengthwise direction.

As described hereinbefore, the four solenoids 23*a* to 23*d*, in each order of the machine, are controlled by respective counter stages in the associated counter decade in accordance with the binary registration in such decade. The solenoids therefore represent the values 1, 2, 4, and 8. Accordingly, for example, when the solenoid 23*a* is energized the arm 156 will be lowered, permitting the rack to advance, sliding the bails 152, 153, and 154 forwardly one increment until the rear end of the slots 175 in the bail 152 engages the rod 155 thereby blocking further advance of the remaining bails and the rack. As a further example of the functioning of the mechanism, Fig. 6 illustrates a condition arising from energizing the solenoid 23*c* and subsequent advance of the rack. As illustrated, the bail 153 is lowered, permitting the rack to advance the bail 154 until the web 162 of the latter abuts the web 160 of bail 152, after four increments of advance.

The following table indicates the condition of the arm 156 and bails 152, 153, and 154 in controlling the different extents of movement of the racks:

| Solenoids Energized | Condition of Stop Arm and Bails | Increments of Rack Movement |
|---|---|---|
| None | Arm and all bails raised | None. |
| 23*a* | Arm 156 lowered | One. |
| 23*b* | Bail 152 lowered | Two. |
| 23*a* and 23*b* | Arm 156 and bail 152 lowered | Three. |
| 23*c* | Bail 153 lowered | Four. |
| 23*a* and 23*c* | Arm 156 and bail 153 lowered | Five. |
| 23*b* and 23*c* | Bails 152 and 153 lowered | Six. |
| 23*a*, 23*b* and 23*c* | Arm 156 and bails 152, 153 lowered | Seven. |
| 23*d* | Bail 154 lowered | Eight. |
| 23*a* and 23*d* | Arm 156 and bail 154 lowered | Nine. |

As noted hereinabove, application of a signal pulse over line 16 (Figs. 1 and 2) is effective to cause a transfer of a count registration in the counter into the readout machine to add this amount in the accumulator 90 and to record the amount on the tape 140 (Fig. 3).

The line 16 is connected through a coupling capacitor 180 to the ignitor of a gas tube 181 of the No. 5823 type. The latter has its cathode directly connected to ground and its anode connected in circuit with the winding of the aforementioned relay 62, and normally closed contacts 182 of switch 21 which normally connects the same to a source 183 of positive potential. A bias resistor 184 connected in the cathode-ignitor circuit of tube 181 normally biases the ignitor of this tube to a potential just below its triggering point. Upon application of a positive signal pulse over line 16, the tube 181 will conduct to energize relay 62 and thus complete a circuit through one or more or none of the solenoids 23*a* to 23*d* in each order, depending upon the condition of the associated counter decades.

Simultaneously, the signal pulse will be transmitted from line 16, over a line 185 to the ignitor of a second normally non-conducting gas tube 186, also of the No. 5823 type. The circuit connections for tube 186 are similar to those for tube 181, whereby application of a signal pulse will cause conduction of this tube. However, the anode of tube 186 is connected in circuit with the winding of a machine control relay 187, resistor 188 and the aforementioned normally closed contacts 182.

Normally open contacts 190 of relay 187 are located in circuit with a clutch control solenoid 191 across a power line circuit 192. The solenoid 191 is operatively connected to the aforementioned machine clutch dog 75. Thus, upon energization of the relay 187, the solenoid 191 will be energized to cause engagement of the clutch.

In order to insure that the clutch is engaged after the various blocking bails 152, 153, and 154 and arm 156 have been conditioned, a condenser 194 is connected in shunt with the winding of relay 187. The time constant resulting from the combination of resistor 188 and condenser 194 provides sufficient delay.

Toward the end of a machine cycle, a cam 195 keyed on the machine drive shaft 73 operates the switch 21 to open the sets of contacts 37 and 182, thus simultaneously resetting the counter decades and de-energizing the control relays 62 and 187.

Means are provided under control of the total key 111 for energizing all of the rack control solenoids, like solenoids 23*a* to 23*d*, during a totalling operation of the machine, so as to permit the racks to be yieldably advanced until arrested by their associated accumulator gears 91 upon reaching their zero conditions in the manner noted hereinbefore.

As indicated in Fig. 2, the total bar 111 has operatively associated therewith two normally open switches 196 and 197.

The switch 196 comprises a pair of normally open contacts located in circuit with a source 198 of positive potential and the signal control line 16. The switch 197 comprises a series of normally open contact leaves connected to respective ones of the control solenoids 23*a* to 23*d*, a lower fixed contact 199 is grounded.

The bar 111 has secured thereto a switch actuating piece 200 of insulating material which, upon depression of the bar, is effective to close switches 196 and 197. Thus, a signal pulse is applied through line 16 to effect energization of the relays 62 and 187, and at the same time the switch 197 is closed to complete circuits through all of the control solenoids, like solenoids 23*a* to 23*d*. Means (not shown) are provided to hold the total bar 111 in depressed condition throughout a totalling cycle of the machine so that the solenoids, like solenoids 23*a* to 23*d*, are effective to enable free forward traverse of the racks.

Although we have described our invention in detail and have therefore used certain terms and languages herein, it is to be understood that the present disclosure is illustrative rather than restrictive and that changes and modifications may be made without departing from the spirit or scope of the invention as set forth in the claims appended hereto. For example, the invention could be applied to counter decades operating on different numeral systems, such as the biquinary system, in which arms, like arm 156, and bails like bails 152, 153, and 154, but of a different number and length of engaging portions and slots may be substituted to effect proper translation of amounts registered by the counter into a decimal notation by the read-out machine. Also, the term "registering element" and equivalent terms in the appended claims is intended to encompass a digit recording, accumulator, or storage element.

Having thus described the invention what we desire to secure by United States Letters Patent is:

1. In a computing system, a read-out device comprising the combination of a registering element differentially settable to different registering positions, means comprising a differential actuator for said element; means for advancing said actuator, a plurality of stops having interengaging portions of different lengths adapted to arrest said actuator in different positions corresponding to different registering positions of said element; means adapted to support said stops with the interengaging portions thereof in serial alignment with each other and with said actuator for movement in the direction of advancement of said actuator whereby to engage each other and said actuator. means for limiting said stops for movement through different respective distances only in the direction of movement of said actuator, and means for selectively maintaining one or more of said stops with the engaging portion or portions thereof out of said serial alignment whereby to arrest said actuator in different ones of said positions thereof.

2. In a computing system, a read-out device comprising the combination of, a registering element differentially settable to different registering positions, means comprising a differential actuator for said element; means for advancing said actuator, a plurality of stops having interengaging portions of different lengths adapted to arrest said actuator in different positions corresponding to different registering positions of said element, means supporting said stops for movement in the direction of advancement of said actuator, means for positioning said stops with said interengaging portions thereof in serial alignment with each other and with said actuator, and means for selectively moving one or more of said stops out of said serial alignment.

3. In a computing system, a read-out device comprising the combination of a registering element differentially settable to different registering positions, means comprising a differential actuator for said element; means for advancing said actuator, a plurality of stops having interengaging portions of different lengths, means for normally supporting said stops with said interengaging portions thereof in serial alignment with each other and with said actuator for movement in the direction of advancement of said actuator, means for limiting movement of said stops through different respective distances only, and means for selectively positioning one or more of said stops with said interengaging portion or portions thereof out of said serial alignment.

4. In a computing system, a read-out device comprising the combination of a registering element differentially settable to different registering positions, means comprising a differential actuator for said element; means for yieldably advancing said actuator, a plurality of stops having interengaging portions of different lengths, means adapted to support said stops with said interengaging portions in serial alignment with each other for movement through different respective distances in the direction of advancement of said actuator, an additional stop having an engaging portion, means adapted to support said additional stop with said engaging portion thereof in alignment with the engaging portion of one of said first mentioned stops, said additional stop being immovable in the direction of advancement of said actuator, and means for selectively maintaining one or more of said stops with the interengaging portion or portions thereof out of said serial alignment.

5. In a computing system, a read-out device comprising the combination of a registering element differentially settable to different registering positions, means comprising a differential actuator for said element; means for yieldably advancing said actuator, a plurality of stops having interengaging portions of lengths progressively varying in accordance with the binary progression of 2, 4, 8, etc., increments, means adapted to support said stops with said interengaging portions in serial alignment with each other and with said actuator for movement through different respective distances in the direction of advancement of said actuator, and means for selectively maintaining one or more of said stops in said serial alignment.

6. In a computing system, a recording device comprising the combination of a recording element differentially settable to different recording positions, means comprising a differential actuator for said element; means for yieldably advancing said actuator, a plurality of stops having interengaging portions of lengths progressively varying in accordance with the binary progression of 2, 4, 8, etc., increments, means for guiding said stops in the direction of movement of said actuator, means for normally positioning said stops with said interengaging portions thereof in serial alignment with each other in the path of said actuator, and means for selectively moving one or more of said stops to locate said engaging portion thereof out of said serial alignment.

7. In a computing system, a recording device comprising the combination of a recording element differentially settable to different recording positions, means comprising a differential actuator for said element; means for yieldably advancing said actuator, a plurality of stops having interengaging portions of lengths progressively varying in accordance with the binary progression of 2, 4, 8, etc., increments, means for supporting said stops for a shifting movement in the direction of movement of said actuator, said last mentioned means limiting movement of the said stop having the shortest engaging portion to one increment of movement, an additional stop adapted to be arranged in serial abutment with said last mentioned stop, means preventing movement of said additional stop in the direction of movement of said actuator, means normally maintaining said stops in serial alignment and in the path of movement of said actuator, and means for selectively moving one or more of said stops to locate said engaging portion or portions thereof out of said serial alignment.

8. In a computing system, a read-out device comprising the combination of a registering element differentially settable to different registering positions, means comprising a differential actuator for said element; means for yieldably advancing said actuator, a pivotal support, a plurality of stops pivotally and slidably mounted on said support for sliding movement in the direction of movement of said actuator, said stops having engaging portions of different lengths, an abutment stop pivotally mounted on said support, means normally maintaining said stops in alignment with each other and with said actuator whereby to block movement of said actuator, and means for pivoting one or more of said stops about said support to positions out of alignment with others of said stops and out of the path of said actuator.

9. In a computing system, a read-out device comprising the combination of a registering element differentially settable to different registering positions, means comprising a differential actuator for said element; means for yieldably advancing said actuator, a pivotal support, a plurality of stops pivotally and slidably mounted on said support for sliding movement in the direction of movement of said actuator, said stops having engaging portions of different lengths, an abutment stop pivotally mounted on said support, and means for selectively pivoting one or more of said stops into alignment with each other and into the path of movement of said actuator.

10. In a computing system, a read-out device comprising the combination of a registering element differentially settable to different registering positions, means comprising a differential actuator for said element; means for advancing said actuator, a pivotal support, a plurality of stops pivotally and slidably mounted on said support for sliding movement in the direction of movement of said actuator, said stops having engaging portions of lengths progressively varying in accordance with the binary progression of 2, 4, 8, etc., increments, said support limiting the movement of said stops to different increments of sliding movement, a blocking stop pivotally mounted on said support, and means for selectively pivoting one or more of said stops into alignment with each other in the path of advancement of said actuator.

11. In a computing system, a read-out device comprising the combination of a registering element differentially settable to different registering positions, means comprising a differential actuator for said element; means for yieldably advancing said actuator, a stationary rod extending transversely to the direction of advancement of said actuator, a plurality of nested stop bails, said stop bails having elongated slots of different lengths slidably and rockably embracing said rod, said bails having engaging portions of different lengths, spring means for normally maintaining said bails with said engaging portions thereof in serial abutment with each other and with said actuator, and means for selectively rocking one or more of said bails out of the path of said actuator.

12. In a computing system, having a counter including counter stages serially related to each other according to the binary progression of 1, 2, 4, and 8, a read-out system for said counter comprising the combination of a recording element differentially settable to different recording positions, means comprising a differential actuator for said recording device; a plurality of stops having interengaging portions of units of length progressively varying in accordance with the binary progression of 2, 4, and 8, means adapted to support said stops with said interengaging portions thereof in serial alignment with each other in the path of advancement of said actuator, said support means limiting each of said stops to a number of units of movement by said actuator equal to one less than the number of units of length of the engaging portion of the said respective stop, an abutment stop engageable with one of said first mentioned stops to prevent movement of said actuator, and means controlled by said counter stages for maintaining respective ones of said stops out of said serial alignment.

References Cited in the file of this patent

UNITED STATES PATENTS

| | | |
|---|---|---|
| 2,044,121 | Lasker | June 16, 1936 |
| 2,077,965 | Smith | Apr. 20, 1937 |
| 2,185,260 | Lasker | Jan. 2, 1940 |
| 2,323,824 | Maschmeyer | July 6, 1943 |
| 2,604,262 | Phelps | July 22, 1952 |